(12) United States Patent
German

(10) Patent No.: US 7,901,162 B2
(45) Date of Patent: Mar. 8, 2011

(54) PIPE TAPPING APPARATUSES AND SYSTEMS

(75) Inventor: Mikhail German, Johnston, RI (US)

(73) Assignee: Mueller International, Inc., Portsmouth, NH (US)

( * ) Notice: Subject to any disclaimer, the term of this patent is extended or adjusted under 35 U.S.C. 154(b) by 909 days.

(21) Appl. No.: 11/504,921

(22) Filed: Aug. 16, 2006

(65) Prior Publication Data

US 2007/0095398 A1     May 3, 2007

Related U.S. Application Data

(66) Substitute for application No. 60/731,193, filed on Oct. 28, 2005.

(51) Int. Cl.
*B23B 35/00* (2006.01)
(52) U.S. Cl. .................. 408/1 R; 408/137; 408/102
(58) Field of Classification Search .............. 408/95, 408/97, 92, 101–102, 137–138, 1 R; 137/317–318
See application file for complete search history.

(56) References Cited

U.S. PATENT DOCUMENTS

| | | | | |
|---|---|---|---|---|
| 2,287,354 A | * | 6/1942 | Misch | 408/101 |
| 2,291,979 A | * | 8/1942 | Mueller et al. | 137/318 |
| 2,745,669 A | * | 5/1956 | Mueller et al. | 279/91 |
| 3,068,725 A | * | 12/1962 | Ver Nooy | 408/81 |
| 3,881,396 A | * | 5/1975 | Case | 408/83.5 |
| 3,995,655 A | * | 12/1976 | Sands | 137/318 |
| 4,711,013 A | * | 12/1987 | Hannah et al. | 29/402.02 |
| 6,321,778 B1 | | 11/2001 | Chen et al. | |
| 6,640,827 B1 | | 11/2003 | McClure | |
| 6,648,562 B1 | | 11/2003 | Calkins et al. | |
| 6,758,237 B2 | * | 7/2004 | Sichler et al. | 137/318 |

OTHER PUBLICATIONS

Transmate, The TapMate Pipe Drilling Machine, Tapmate Owners Manuel, Nov. 30, 1995, Bothell, WA.

* cited by examiner

*Primary Examiner* — Daniel W Howell
(74) *Attorney, Agent, or Firm* — Alston & Bird LLP

(57) ABSTRACT

Pipe tapping apparatuses, devices, methods, and systems are provided for hot-tapping a pipe or fluid conduit containing a pressurized fluid. According to an embodiment, a pipe-tapping device can comprise a machine lower portion, a machine feed portion, and a machine drive portion. The machine lower portion can be disposed proximate to a pipe and can include a threaded insert situated distal to the pipe. The machine feed portion can include a first thread set and a second thread set. The first thread set can correspond to the threaded insert so that the machine feed portion is adapted to move axially relative to the machine lower portion. The machine drive portion can include a threaded interior. The threaded interior can correspond to the second thread set so that the machine drive portion is adapted to move axially relative to the machine feed portion. Other various embodiments are also claimed and described.

11 Claims, 4 Drawing Sheets

PIPE TAPPING APPARATUSES AND SYSTEMS

CROSS-REFEENCE TO RELATED PATENT APPLICATION

This Application claims priority to and the benefit of U.S. Provisional Application No. 60/731,193, filed 28 Oct. 2005, which is hereby incorporated by reference as if fully set forth below.

TECHNICAL FIELD

The various embodiments of the present invention relate generally to pipes and other fluid conduits, and more particularly, to apparatuses, methods, and systems to tap pipes and other fluid conduits under pressure from a support assembly.

BACKGROUND

Various tapping machines and apparatuses have been developed for drilling or cutting a hole or opening into fluid containing pipe or vessel. Those skilled in the art know that this technique is called hot-tapping. The purpose of hot-tapping is to tap into a pipe or other fluid vessel that is still acting as a fluid conduit so that the fluid supplied in the pipe does not need to be cut off. Thus, hot-tapping enables users to tap into a pipe or fluid conduit to obtain access to the fluid without disrupting the fluid supply. Several issued U.S. patents discuss hot-tapping, including U.S. Pat. No. 6,321,778 ("Chen"), U.S. Pat. No. 6,640,827 ("McClure"), and U.S. Pat. No. 6,648,562 ("Calkins"). These patents are incorporated herein by reference in their entireties as if fully set forth below.

Typically hot-tapping devices are connected or coupled to a tapping valve. Tapping valves are usually welded, clamped or otherwise mounted or attached to an outer wall of the pipe or vessel, such as it shown and discussed in McClure. A machine or apparatus housing is connected to a tapping valve, often with the use of a special adapter. To drill a hole in a pipe, the tapping valve should be open so that a drilling tool can be advanced toward a pipe, as shown and discussed in Chen and Calkins. Once the drilling tool is in place, the drilling operation can be initiated to cut a hole in the wall of the pipe or fluid conduit to gain access to fluid (gas or liquid) located within the interior of the pipe or fluid conduit.

Conventional pipe tapping devices generally have a feed screw to advance the drilling tool in the tapping valve toward the pipe and continuously through the drilling operation. Total traveling length required for the feed screw to complete drilling operation, depends on pipe diameter, valve height, and saddle height. For a typical medium size pipe this traveling length may reach significant numbers. For example, total traveling length required to conduct a drilling/tapping operation on a 12" pipe is approximately 20" to approximately 22" (depending on the valve and saddle dimensions). Considering that conventional feed screws have threads with a small pitch (8-14 threads per inch), the total number of the feed nut rotations to advance the feed screw may reach approximately 160-308 rotations for the above 12" pipe.

As a result of the large number of feed nut rotations, tapping pipe with conventional pipe tapping devices requires significant time. At the same time, just a small portion of the required traveling, approximately 20% relates directly to the drilling operation. Whereas, the other 80% of traveling is required to move the drilling tool through the tapping valve and saddle up into contact with a pipe's outer surface wall.

Some conventional devices have attempted to address this problem, but still currently have drawbacks. For example, "The TapMate™ Pipe Drilling Machine" by TRANSMATE (a Division of Romac Industries, Inc.) is one conventional device. The TapMate device utilizes an accelerated movement of a drilling tool through a tapping valve and a saddle by using two telescoping square tubes: brake and thrust. These tubes slide one inside of the other to provide quick travel. The brake tube has a metal brake shoe to lock the tubes together before tapping. After tapping is finished, the brake shoe must be unlocked to retract the thrust tube. At this moment, however, the boring bar providing rotational force to the drilling tool is under pipeline pressure, and loosening the brake nuts may lead to jumping or rapid movement of the thrust tube, potentially causing very serious injury. It may be very dangerous to a person conducting tapping, considering that axial force, applied to the tube, may reach several hundred pounds, depending on line pressure and boring bore diameter. Indeed, the TapMate Owners Manual recommends loosening the brake nuts while standing to the side of machine to avoid injury from pressure pushing back on the bar.

What is needed, therefore, is a pipe tapping apparatus, system, and method that reduces the overall time for tapping a pipe in light of the large ratio of feed nut turns to travel distance needed to place the drilling tool in contact with a pipe. What is also needed is a pipe tapping apparatus, system, and method that can be effectively used without causing harm to a user by providing sufficient protection from the effects of high pressure fluid within a pipe or other fluid conduit.

BRIEF SUMMARY

The various embodiments of present invention provide improved pipe apparatuses, systems, and methods enabling users to tap into a pipe under pressure and providing solutions to the above discussed drawbacks. In addition, the various embodiments of the present invention enable users safely, effectively, and efficiently tap pipes that are under pressure in short time periods without fear of being injured by unwanted impact of high pressure contained within the pipe.

Broadly described, some pipe-tapping device embodiments of the present invention can comprise a machine lower portion adapted to be disposed proximate to a pipe. The machine lower portion can include a threaded insert situated distal to the pipe. A pipe-tapping device can also comprise a machine feed portion that includes a first thread set and a second thread set, and a machine drive portion that includes a threaded interior. The first thread set can correspond to the threaded insert so that the machine feed portion is adapted to move axially relative to the machine lower portion. The threaded interior can correspond to the second thread set so that the machine drive portion is adapted to move axially relative to the machine feed portion. These and other embodiments of the present invention are described in more detail below in conjunction with the drawings.

BRIEF DESCRIPTION OF THE DRAWINGS

The subject matter that is regarded as embodiments of the present invention is particularly pointed out and distinctly claimed in the claims at the conclusion of the specification. The foregoing and other objects, features, and advantages of embodiments of the present invention are apparent from the following detailed description taken in conjunction with the accompanying drawings in which:

Figure 1:
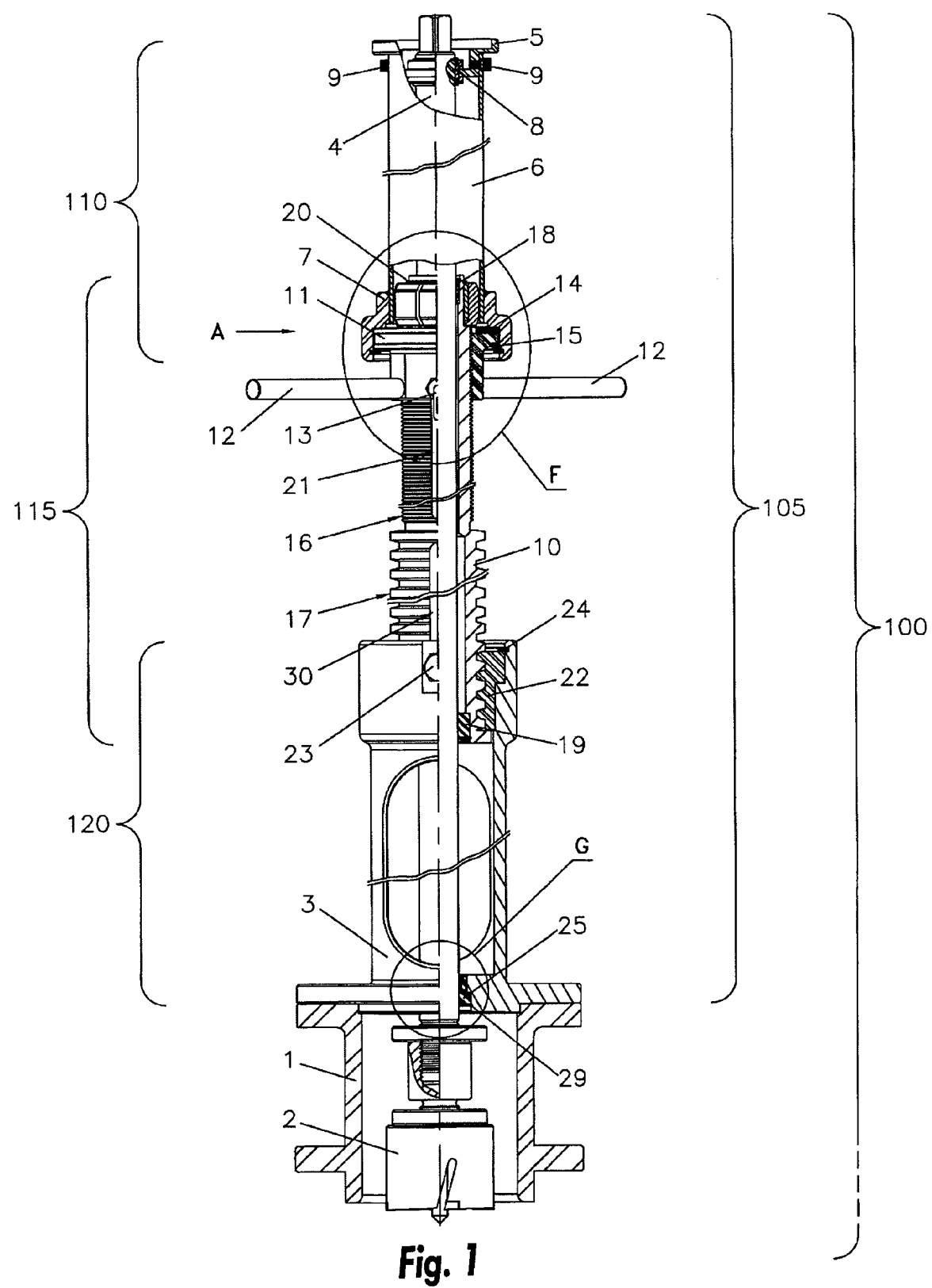
FIG. 1 illustrates a perspective view of an embodiment of pipe tapping system in accordance with exemplary embodiments of the present invention.

The detailed description explains various preferred and alternative embodiments of the present invention, together with advantages and features, by way of example with reference to the drawings.

DETAILED DESCRIPTION OF PREFERRED & ALTERNATIVE EMBODIMENTS

Referring now in detail to the figures, wherein like reference numerals represent like parts throughout the several views.

When it is desired to tap a pressurized pipe without interrupting service on a pipe, a tapping saddle/fitting is secured to the pipe. The tapping saddle/fitting is sealed on a pipe's exterior, and a tapping valve is connected to the tapping saddle. The pipe, saddle, and valve are not shown in the drawings provided in this application, but typical pipes, saddles, and tapping valves are shown in Calkins, Chen, and McClure. Before installation on the tapping valve, a drilling machine should be assembled.

FIG. 1 illustrates a perspective view of an embodiment of pipe tapping system 100 in accordance with an exemplary embodiment of the present invention. The pipe tapping system 100 includes a pipe tapping apparatus 105, a machine adapter 1, and support system (not shown). The support system may comprise a tapping valve and a saddle/fitting, secured to a pipe. The machine adapter 1 is preferably adapted to be mated with the tapping valve (not shown) so that the tapping apparatus 105, support system (not shown), and the machine adapter 1 form the pipe tapping system 100 according to some embodiments of the present invention. The adapter 1 should have a size corresponding to the size of the drilling tool 2, and is connected to a housing 3, which is a component of the pipe tapping apparatus 105, by means of bolts and nuts.

The pipe tapping apparatus 105 comprises additional parts as described in greater detail below. For example, the pipe tapping apparatus 105 may comprise a machine drive portion 110, a machine feed portion 115, and a machine lower portion 120. Each of these portions also contains various component parts as further discussed below.

Figure 6:
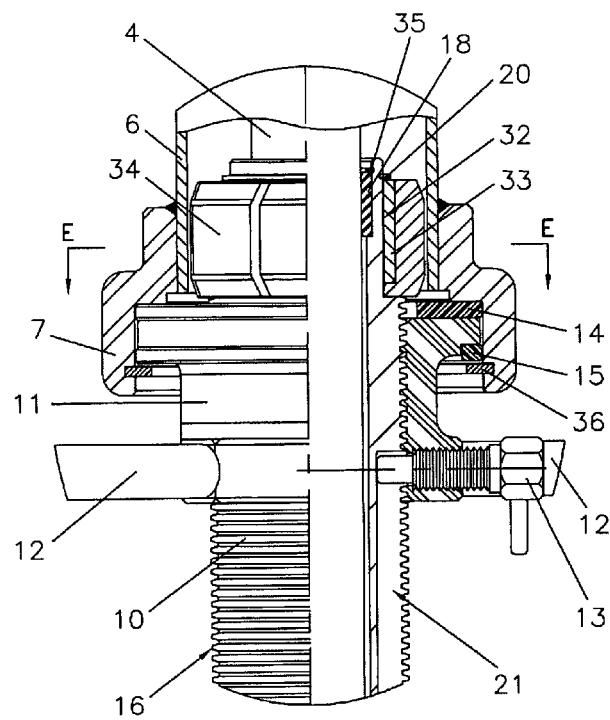
FIG. 6 illustrates a close-up view of the apparatus assembly detail F taken from direction A in FIG. 1.
Figure 8:
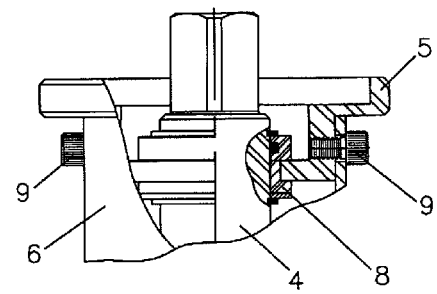
FIG. 8 illustrates a close-up view of an upper end of the apparatus intended for the operator connection in accordance with exemplary embodiments of the present invention.

In exemplary embodiments, the upper drive portion 110 is adapted to receive a drive mechanism (or operator). The drive mechanism can be any machine capable of providing a rotational force to a boring bar 4 such as an air driver, hydraulic driver, or the like. As illustrated in FIG. 8, the machine drive portion 110 also comprises an operator adapter plate 5 for receiving an operator. Other major components contained within the machine drive portion 110, as illustrated in FIGS. 1, 6, and 8, include a square tubing 6, a connector 7, a bearing 8, the boring bar 4, feeding nut 11, and hardware 9 for coupling the operator adapter plate 5 to the square tubing 6. The various components of the machine drive and feed portions 110, 115 enable the operator to provide a rotational energy (movement) to the boring bar 4 for tapping pipe. As shown in FIGS. 1 and 6-11, the boring bar 4 is housed internally within the pipe tapping apparatus 105 and is adapted to rotate within it.

Figure 4:
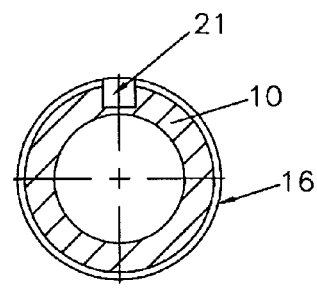
FIG. 4 illustrates a sectional view of the apparatus body taken from line C-C in FIG. 2.
Figure 5:
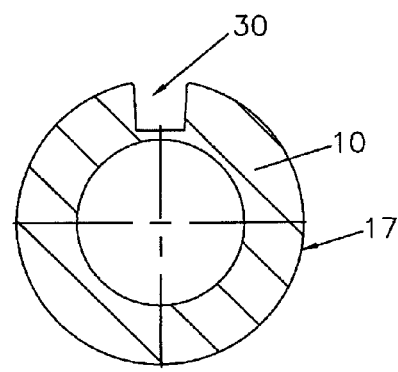
FIG. 5 illustrates a sectional view of the apparatus body taken from line D-D in FIG. 2.

The machine feed portion 115 is adapted to move in an axial direction relative to one or more components of the pipe tapping apparatus 105. As shown in FIGS. 1 and 6, the machine feed portion 115 comprises an apparatus body 10 with two threaded portions 16 and 17, handles 12, and a spring loaded plunger 13. The machine feed portion 115 also includes top and bottom feeding nut bearings 14, 15, which reduce a friction between the feeding nut 11 and connector 7. The spring plunger 13 is discussed in more detail below with reference to FIGS. 2, 4, and 6. The machine feed portion 115 also comprises an upper body bearing 18, a lower body bearing 19, an outer square bearing 34, and an inner square bearing 33.

Depending on the status of the spring plunger 13, rotation of the handles 12 can produce the movement of the different portions of the pipe tapping apparatus 105. For example, if the spring plunger 13 is in an engaged position, where it is locked into an upper slot 21, as shown in FIG. 6, then rotating the handles 12 will not allow the feeding nut 11 to move axially relative to the apparatus body 10, but, instead, will produce an axial movement of the machine drive and machine feed portions 110, 115 by means of a threaded connection between body driving thread 17 and threaded insert 22. If the spring plunger 13 is fully retracted and not engaged in the first slot 21 and stop bolt 23 is engaged in second slot 30, then rotation of the handles 12 causes the feeding nut 11 to move axially relative to the apparatus body 10. Those of ordinary skill in the art will, of course, understand that clockwise and counter-clockwise rotation of the handles can cause different direction of the axial movements (e.g., up or down the apparatus body). Thus, depending on status of spring plunger 13, the pipe tapping apparatus 105 can selectively operate in multiple operational modes.

The operational modes can be selectively engaged and can include a positioning mode and a tapping mode. In the positioning mode, a tapping tool can be placed in close proximity to a pipe prior to tapping, and in the tapping mode, a tapping tool can engage and tap a pipe. While in the different operational modes, the different thread sets can be utilized as discussed in more detail below. For example, in the positioning mode, a first thread set can be used to rotatably position a pipe tapping tool close to a pipe, and in the tapping mode, a second thread set can be used during a pipe tapping procedure. The different thread sets can have different thread pitches to provide quick positioning prior to tapping and precise axial movement during a pipe tapping procedure.

Turning now to FIGS. 2-5, close-up and sectional views of the apparatus body 10 of a pipe tapping apparatus 105 having multiple sets of threads 16, 17 in accordance with some embodiments of the present invention are illustrated. According to the various embodiments of the present invention, the second thread set 16 has a smaller pitch than the pitch of the first thread set 17. While the exact pitches between the two thread sets can vary upon exact application, the first thread set 17 can have a pitch that moves axial positions approximately 4 to approximately 8 times faster than the second thread set 16 in exemplary embodiments of the present invention. Other thread pitch ratios, however, are possible according to other embodiments of the present invention.

Preferably, the second thread set 16 has a large number of threads per inch for precise movement of the cutting devices, and the first thread set 17 has a small number of threads per inch for fast movement of the cutting devices toward the pipe. Sample pitch sizes include approximately eight to approximately twelve threads per inch for the second thread set 16 and approximately one to approximately four threads per inch for the first thread set 17. Other pitch sizes are also possible.

The second thread set 16 is primarily used during pipe cutting/tapping operations. Its smaller, finer pitch enables greater control of cutting devices and their axial movement toward a pipe. When the handles 12 are rotated and if the spring plunger 13 is in the disengaged position while stop bolt 23 is engaged in second slot 30, the machine drive portion 110 moves axially on the second thread set 16 due to feeding nut 11. The machine drive portion 110 also rotatably houses the boring bar 4, and axial movement of the drive portion causes axial movement of the boring bar 4 and the drilling tool 2.

The larger thread pitch of the first thread set 17 is adapted to place the cutting device 2 proximate a pipe prior to tapping. Usually the first thread set 17 is not used during a cutting or tapping operation. Due to the large pitch of the first thread set 17, few rotations of the handles 12 are required to place the cutting device in the proper pre-cutting (or pre-tapping) position. Rotation of the first thread set 17 inside the threaded insert 22 also axially positions the machine drive and machine feed portions 110, 115 and their components closer to the pipe to be tapped. Accordingly, the first thread set 17 enables quicker set-up times and more efficient pipe tapping operations.

Also shown in FIGS. 2-5 are the first slot 21 and the second slot 30. The first slot 21 is adapted to receive the spring plunger 13 and the second slot 30 is adapted to receive the stop bolt 23. As shown, the first and second slots 21, 30 can traverse the length of the first and second thread sets 17, 16 to enable locking of the feeding nut 11 and apparatus body 3 in many positions.

Figure 7:
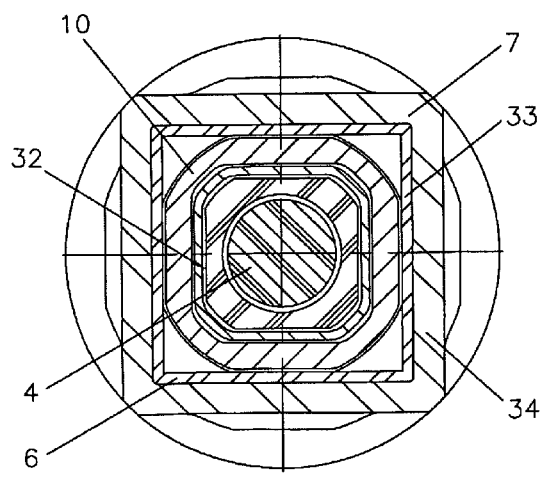
FIG. 7 illustrates a sectional view taken from line E-E in FIG. 6.

As illustrated in FIGS. 6 and 7, the outer square bearing 34 is housing the inner square bearing 33, which, in its own line, houses a body top square portion 32 of the apparatus body 10. Both square bearings 33 and 34 are locked in place with a square bearing retaining ring 20. To prevent the square bearings 33 and 34 from rotation, the body top portion 32 has a partially square shape. The square outer surface of the bearing 34, mating the inside square surface of the square tubing 6, protect the machine drive portion 110 of the pipe tapping apparatus 105 from rotation relative to the machine feed portion 115 during drilling operation when the stop bolt 23 engaged in the slot 30, the spring plunger 13 disengaged from the slot 21, and operator is turned on.

This arrangement allows full rotation power transfer from the operator to the boring bar 4. To reduce friction between the square tubing 6 and outer square bearing 34 during drilling operation, when the machine drive portion 110 is moving axially relative to the machine feed portion 115, the outer square bearing 34 may be made from material with low friction: plastic, brass, etc.

The machine lower portion 120 couples the machine feed portion 115 to the machine adapter 1. As shown in FIGS. 1 and 9-11, the machine lower portion 120 comprises the machine housing 3, the threaded insert 22, the stop bolt 23, and the threaded insert retaining ring 24, which lock in place the threaded insert 22. In addition, the machine lower portion 120 comprises a pressure bearing 25 with the static O-rings 26 and 27 and a dynamic O-ring 28, and a pressure bearing retaining ring 29 which lock in place the pressure bearing 25. To prevent rotation of the threaded insert 22 inside apparatus housing 3, the threaded insert 22 has a threaded insert square portion 37 which is housed by a machine housing square opening 38 in the housing 3.

Figure 9:
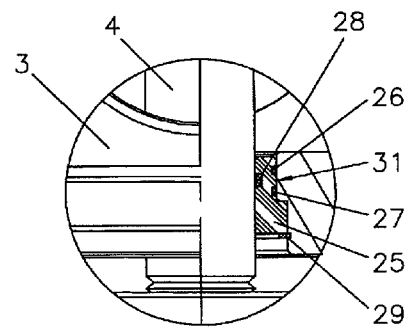
FIG. 9 illustrates a close-up view of detail G from FIG. 1, showing area of the line pressure sealing in accordance with exemplary embodiments of the present invention.

As illustrated in FIG. 9, the components of the machine lower portion 120 provide a pressure barrier between the chamber within the machine adapter 1 and the interior of the machine housing 3 so that a pressurized fluid under pipe pressure can not escape into the machine housing 3. The dynamic O-ring 28 creates a pressure barrier between an inside surface of the pressure bearing 25 and outside surface of the boring bar 4, while the O-rings 26 and 27 create a barrier between an outer surface of the pressure bearing 25 and a surface of a hole for pressure bearing 31 in a lower portion of the machine housing 3. This feature of various embodiments of the present invention thus allows only few portions of the pipe tapping system 100, such as the machine adapter 1, tapping valve, and saddle/fitting, to be adapted to handle high pressures. Thus, this pressure barrier allows all component parts of the pipe tapping apparatus 105 to be built with light materials because these component parts will not be subjected to fluids under high pressure. This provides a lightweight, easy to use pipe tapping apparatus 105.

Figure 2:
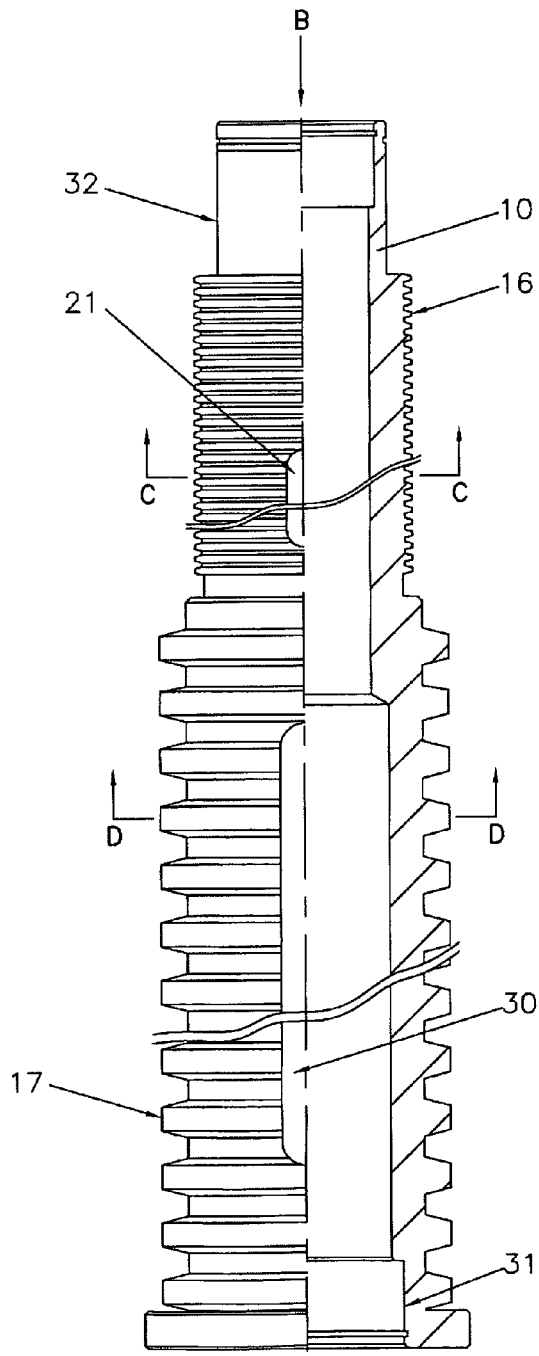
FIG. 2 illustrates a body of a pipe tapping apparatus having multiple sets of threads in accordance with exemplary embodiments of the present invention.
Figure 3:
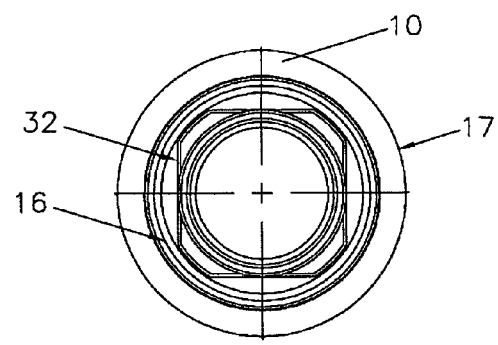
FIG. 3 illustrates a top view of the apparatus body taken from direction B in FIG. 2.
Figure 10:
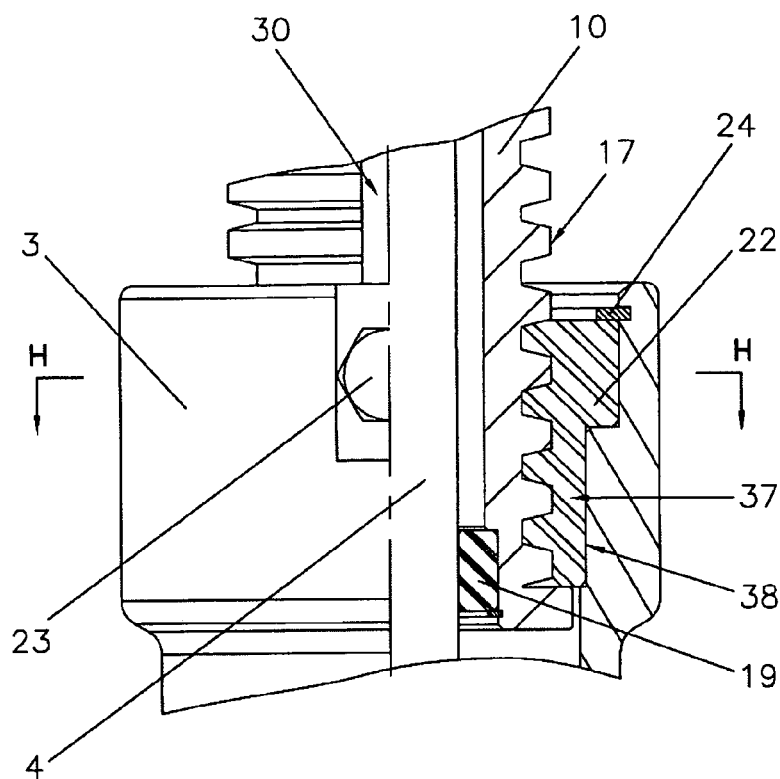
FIG. 10 illustrates a close-up view around the area of the apparatus body driving nut.
Figure 11:
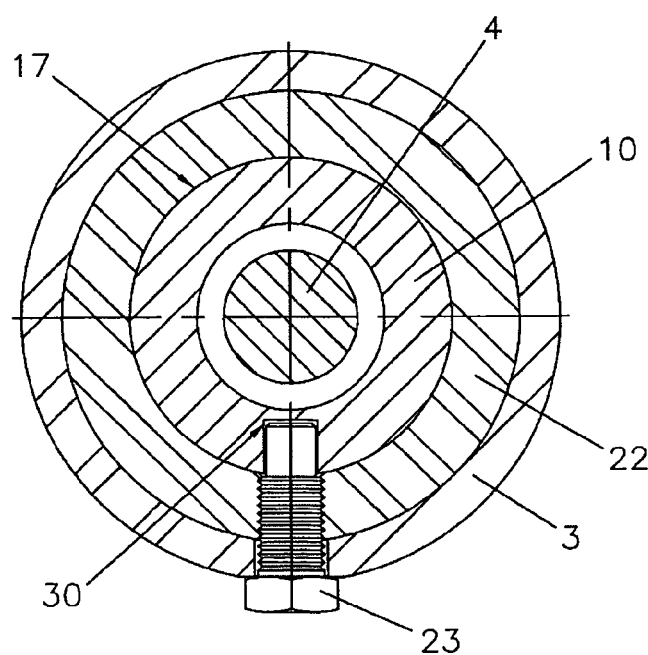
FIG. 11 illustrates a sectional view taken from line H-H in FIG. 10.

The first thread set 17, illustrated in FIGS. 1, 2 and 10, enables the machine feed portion 115 and the machine drive portion 110 to move relative to the machine housing 3 when the spring plunger 13 is engaged in the slot 21 and handles 12 are rotated. Indeed, when the spring plunger 13 is engaged and rotational energy is provided to the handles 12, the rotational energy is transferred to the first thread set 17. This causes the first thread set 17 to move relative to the threaded insert 22 thereby causing axial movement of the first thread set 17 within the threaded insert 22. This also causes the machine feed portion 115 to move relative to the machine housing 3. As fully explained in more detailed below, this form of axial movement of various embodiments of the present invention enables a user to axially position the machine feed portion 115 and the drilling tool 2 in a cutting/tapping position for a pipe.

At certain times during operation of the pipe tapping apparatus 105, the stop bolt 23 can engage the lower slot 30 to prevent the first thread set 17 from rotating in the threaded insert 22. For example, during tapping operation of the pipe tapping apparatus 105, the stop bolt 23 is preferably engaged in the lower slot 30 to prevent the first thread set 17 from rotating inside the machine housing 3. This prevents the machine drive and machine feed portions 110, 115 from rotating relative to the machine housing 3 and enables transfer of rotational energy from the operator (not shown) to the boring bar 4 and drilling tool 2.

In operation, the pipe tapping apparatus 105 works as follows according to some method embodiments of the present invention. The pipe tapping apparatus 105 is connected to the machine adapter 1. The spring plunger 13 is advanced in the upper slot 21, located in a second thread set 16, and the stop bolt 23 is preferably fully retracted from the lower slot 30, located in the first thread set 17. The machine drive and machine feed portions 110, 115 of the pipe tapping apparatus 105, by means of the handles 12 connected to the feeding nut 11, is advanced forward/down to a point where the drilling tool 2 can be coupled to the boring bar 4. After the drilling tool 2 is connected to the boring bar 4, the machine feed portion 115 with the connected machine drive portion 110 are retracted to their rearmost position, and the machine adapter 1 is connected to a tapping valve (not shown) using bolts and nuts to couple a bottom flange of the machine adapter 1 and top flange of the tapping valve.

By rotating the handles 12 coupled to the feeding nut 11, the machine feed and machine drive portions 110, 115 of the pipe tapping apparatus 105 can be advanced through an open tapping valve and saddle until the drilling tool 2 contacts an outer surface of a pipe. Next, the handles 12 should be rotated so that the machine feed portion 115 is retracted up to the nearest point where the stop bolt 23 can be advanced in the lower slot 30, located in the first thread set 17 of the pipe tapping apparatus body 10. An operator or drive mechanism (not shown) can be connected to the operator adapter plate 5. The spring loaded plunger 13 is retracted from the upper slot 21, located in a second thread set 16, and locked in an out position. The operator is turned on, and rotation of the boring bar 4 commences. Since the drilling tool 2 is coupled to the boring bar 4, it also starts rotating at substantially the same rotational velocity.

The tapping operation initiates with an advance of a drilling tool 2 in a pipe wall by rotating the handles 12. Because the handles 12 are connected to the feeding nut 11, the feeding nut 11 moves toward the pipe. More specifically, the feeding nut 11 pulls down axially along the second thread set 16 the connector 7 with the square tubing 6, the operator adapter plate 5 and, connected to it operator (not shown). Rotation of the handles 12 axially moves the drilling tool 2 toward the pipe. The handles 12 are continuously rotated until the drilling tool 2 has cut a hole into a pressurized pipe and the tapping operation is complete. When a hole is cut into the pipe, the pressurized fluid (gas or liquid) within the pipe escapes through the cut hole and pressurizes the tapping valve and the chamber within the machine adapter 1.

After the tapping operation is complete, the operator is turned off and disconnected from the operator adapter plate 5. The spring plunger 13 is unlocked and advanced into the upper slot 21, located in the second thread set 16. Also, stop bolt 23 is fully retracted from the lower slot 30, located in the first thread set 17, and the apparatus body 10 is retracted to its rearmost position. Next, the spring plunger 13 is fully retracted from the upper slot 21, located in the second thread set 16, and rotation of the handles 12 retracts the boring bar 4 to its rearmost position. Now since the boring bar 4 is retracted, the drilling tool 2 is also retracted out of the tapping valve and away from the tapping valve gate.

Next with the cutting device removed, the tapping valve can be closed so that the pressurized fluid from the pipe is contained. As for any pressurized fluid contained within the chamber of the machine adapter 1, this fluid can be drained using a drain port (not shown) located on the machine adapter 1. Then, the pipe tapping apparatus 105 and the machine adapter 1 can be disconnected from the tapping valve, with a hot-tapping procedure completed.

While the various embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

I claim:

1. A pipe-tapping apparatus comprising:
   a machine lower portion adapted to be disposed proximate a pipe and comprising a threaded insert;
   a machine feed portion comprising a first thread set and a second thread set, the first thread set corresponding to the threaded insert so that the machine feed portion is adapted to move axially relative to the machine lower portion; and
   a machine drive portion comprising a threaded interior, the threaded interior corresponding to the second thread set so that the machine drive portion is adapted to move axially relative to the machine feed portion,
   wherein the machine drive portion comprises a locking member to engage the second thread set so that the machine drive portion is inhibited from moving axially relative to the machine feed portion.

2. The apparatus of claim 1, wherein the first thread set and the second thread set have different thread pitches so that the machine feed portion and the machine drive portion have different axial movement rates.

3. The apparatus of claim 1, wherein the machine lower portion comprises means interacting with the first thread set so that machine feed portion is inhibited from moving axially relative to the machine lower portion.

4. The apparatus of claim 1, further comprising at least one handle member adapted to provide rotational energy to the machine drive portion in a first operational mode and to the machine feed portion in a second operational mode.

5. The apparatus of claim 1, wherein the second thread set has a higher thread pitch than the first thread set.

6. The apparatus of claim 1, wherein the machine lower portion comprises an engaging member to engage the first thread set so that machine feed portion is inhibited from moving axially relative to the machine lower portion.

7. A pipe-tapping method comprising:
   providing a pipe-tapping device proximate a pipe, the pipe-tapping device comprising a first thread set and a second thread set with different thread pitches so that the first thread set and second thread set provide different axial movement rates;
   selectively engaging one of the first thread set and the second thread set to enable positioning of the pipe-tapping tool in a second operational mode and tapping of the pipe in a first operational mode;
   positioning the pipe-tapping tool proximate to an outer surface of the pipe with the first thread set, the pipe-tapping tool being adapted to be removably secured to the pipe-tapping device; and
   tapping the outer surface of the pipe using the pipe-tapping tool in communication with the second thread set.

8. A pipe-tapping method comprising:
   providing a pipe-tapping device proximate a pipe, the pipe-tapping device comprising a first thread set and a second thread set with different thread pitches so that the first thread set and second thread set provide different axial movement rates;
   selectively engaging one of the first thread set and the second thread set to enable positioning of the pipe-tapping tool in a second operational mode and tapping of the pipe in a first operational mode;
   positioning the pipe-tapping tool proximate to an outer surface of the pipe with the first thread set, the pipe-tapping tool being adapted to be removably secured to the pipe-tapping device; and tapping the outer surface of the pipe using the pipe-tapping tool in communication with the second thread set.

9. The method of claim 7, further comprising attaching an operator to the pipe-tapping device, the operator operable to provide rotational energy to the pipe-tapping tool.

10. The method of claim 7, wherein the second thread set has a higher pitch ratio relative to the first thread set.

11. A pipe tapping method comprising the steps of:

providing a pipe-tapping device proximate a pipe, the pipe-tapping device comprising a first thread set and a second thread set with different thread pitches so that the first thread set and second thread set provide different axial movement rates;

positioning a pipe-tapping tool proximate an outer surface of the pipe with the first thread set, the pipe-tapping tool being adapted to be removably secured to the pipe-tapping device;

engaging a locking mechanism to inhibited axial movement via the first thread set after positioning the pipe-tapping tool proximate to the outer surface of the pipe; and tapping the outer surface of the pipe using the pipe-tapping tool in communication with the second thread set.

* * * * *

UNITED STATES PATENT AND TRADEMARK OFFICE
CERTIFICATE OF CORRECTION

| | |
|---|---|
| PATENT NO. | : 7,901,162 B2 |
| APPLICATION NO. | : 11/504921 |
| DATED | : March 8, 2011 |
| INVENTOR(S) | : German |

Page 1 of 1

It is certified that error appears in the above-identified patent and that said Letters Patent is hereby corrected as shown below:

Title Page

"(66) Substitute for application No. 60/731,193, filed on October 28, 2005."

should read --(66) Provisional application No. 60/731,193, filed on October 28, 2005.--

Signed and Sealed this
Thirty-first Day of May, 2011

David J. Kappos
*Director of the United States Patent and Trademark Office*